June 17, 1941. J. O. ALMEN 2,246,231
CLUTCH
Filed June 16, 1939
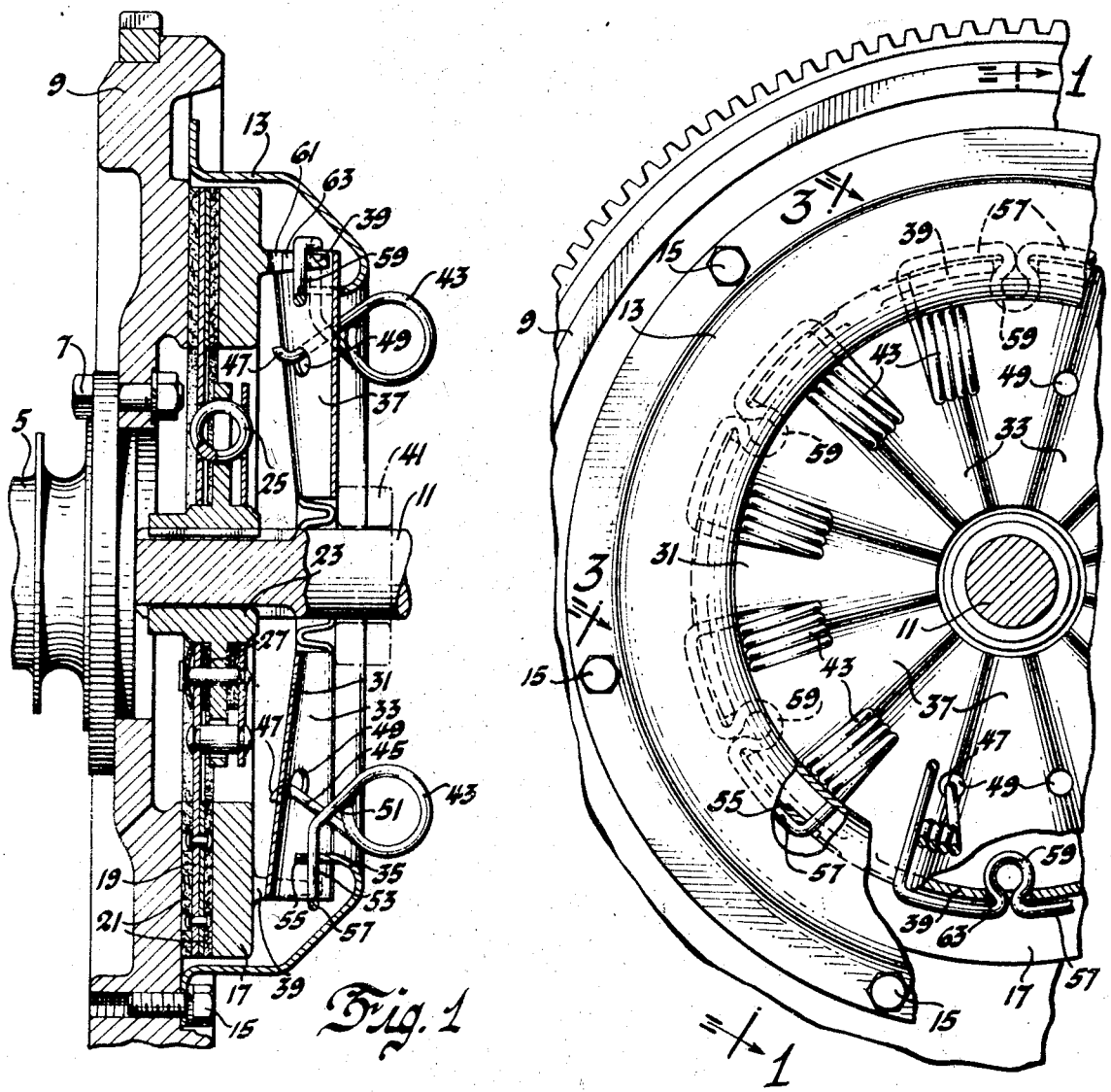
Fig. 1
Fig. 2
Fig. 3
Fig. 4
Inventor
John O. Almen
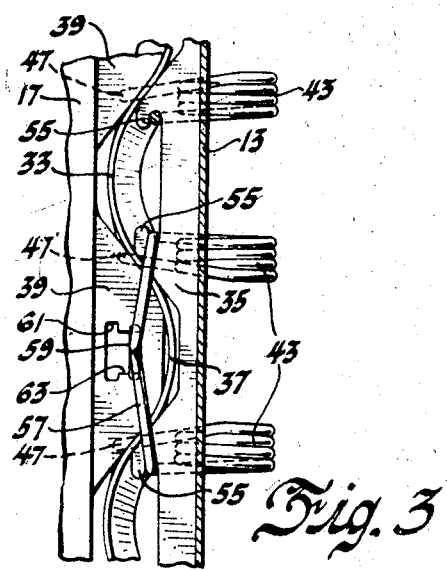
Attorneys Patented June 17, 1941

2,246,231

UNITED STATES PATENT OFFICE 2,246,231

CLUTCH

John O. Almen, Royal Oak, Mich., assignor to General Motors Corporation, Detroit, Mich., a corporation of Delaware Application June 16, 1939, Serial No. 279,412

4 Claims. (Cl. 192—68)

This invention relates to clutches and more particularly to a disc clutch such as is used to releasably couple the engine shaft and the change speed input shaft of a motor vehicle.

In clutches of the kind referred to there are frequently used, in addition to the resilient clutch engaging means, springs which function to release the driven clutch plate from the frictional grip of the driving members when the pressure of the main clutch spring is withdrawn. An object of this invention is to so modify these last mentioned springs that they may function additionally to supplement the pressure exerted by the main clutch spring when it is active.

Other objects including efficiency and economy in accomplishing the major object will be understood from the description which follows.

The invention is illustrated by the accompanying drawing in which:

Figure 1 is a transverse section through the clutch, the section being indicated by line 1—1 of Figure 2.

Figure 2 is a view in elevation, partly broken away.

Figure 3 is a sectional view substantially as indicated by line 3—3 of Figure 2.

Figure 4 is a perspective of one of the supplemental springs.

The clutch shown is quite similar to that constituting the subject matter of my Patent 2,100,464 in that it uses a corrugated coned spring to effect clutch engagement. Like the patented clutch there are also springs to release the grip of the driving members upon the driven member when the main spring is rendered inactive. This application discloses an improvement in the said auxiliary springs. In accordance with the improvement they not only serve the purpose of withdrawing the pressure plate when the main spring is inactive but also they act through the aid of centrifugal force to supplement the pressure of the main spring when it is in active position.

In the drawing, numeral 5 represents the engine crankshaft to which is secured by fastening means 7 a flywheel 9. Coaxial with the engine shaft is a shaft 11, a clutch driven shaft which serves as the input shaft of the change speed transmission.

At 13 is a cover and abutment plate peripherally secured to the flywheel at 15. Within the cover is a pressure plate 17 adapted to reciprocate and to grip between itself and the flywheel a driven plate 19 having frictional faces 21. At 23 is a hub which is mounted to rotate with shaft 11 and to have limited axial movement thereon. It is unnecessary to describe the connection between the hub 23 and the driven plate 19 for the reason that this invention is not concerned with that connection. The drawing shows springs 25 by which the driving torque between parts 9 and 23 is cushioned and it also shows a frictional drag expedient marked 27.

The main clutch spring is a coned annulus 31. It has corrugations 33 open toward the rear to receive lugs 35 projecting from the cover. These lugs project into the radially outer and wider ends of the corrugations. Alternating with corrugations 33 are corrugations 37 facing toward the flywheel and receiving pressure plate lugs 39 which also fit into the wider and outer ends of the corrugations. The region of the spring engaged by lugs 39 is radially outward from the portion engaged by lugs 35 and the spring 31 is so prestressed in assembly that its pressure against the pressure plate lugs has a reaction against the cover plate lugs. To release the spring load on the pressure plate any preferred throwout mechanism, such as that represented by numeral 41, takes the load from the cover lugs. Suitable springs are rendered effective in response to the movement of the throwout device to pull the pressure plate from the driven plate. Instead of such springs as are shown in my patent above referred to modified springs are used, as shown in perspective in Figure 4. Each spring includes two spaced coils 43. From the innermost end of each coil is a tangential extension 45 terminating in a bent end 47. These bent ends are received in apertures 49 of the coned spring. From the outermost ends of the coils are tangential extensions 51 from which project arms 53 which extend radially when the springs are assembled in the clutch. These arms 53 are stressed to engage within hooks 55 of the cover plate. The ends of arms 53 are merged into arms 57 which are united by a loop 59, the loop being bent outwardly and passed through the enlarged part 61 of an opening 63 in the pressure plate, from which outer position it moves under the influence of its resiliency to the narrow part of the opening and is thereby locked in position.

The clutch is disengaged by a movement of the throwout mechanism toward the flywheel. This mechanism similarly moves the apex of the cone of the spring and takes the reaction of the spring, relieving the load on the cover. As the main spring is thus moved, its movement is effective on each of the circular series of auxiliary springs and, because of the connection between the two springs at 47, each auxiliary spring fulcrums about its contact with the cover, and, because of its connection with the pressure plate, the pressure plate is moved from the flywheel. When the pressure on the throwout mechanism is released, the parts are restored to clutch engaging position. As the car driven by the clutch develops speed, the heavy portions of each spring, the coils, move under the influence of centrifugal force. In consequence of this movement there is a pull through arm 45 upon the coned spring at 49. This causes the main spring to have a fulcrum action about its contact with the cover and its outer periphery is pushed against the lugs of the pressure plate to thereby supplement the normal pressure of the spring 31.

I claim:

1. In a clutch, a flywheel, a cover, a pressure plate, a driven plate between the flywheel and pressure plate, a main spring engaging the pressure plate and reacting on the cover, auxiliary springs to withdraw the pressure plate, each auxiliary spring having a weighted mass subject to centrifugal force to supplement the pressure of the main spring on the pressure plate, each of said auxiliary springs having parts engaging said pressure plate and cover and terminally connected to said main spring.

2. In a clutch, a flywheel, a cover, a pressure plate, a driven plate between the flywheel and pressure plate, a main spring engaging the pressure plate and reacting on the cover, auxiliary springs to withdraw the pressure plate, each auxiliary spring having a weighted mass subject to centrifugal force to supplement the pressure of the main spring on the pressure plate, each of said auxiliary springs having a part adapted to fulcrum on said cover and a portion on each side thereof connected to said pressure plate on one side and to the main spring on the other.

3. In a clutch, a flywheel, a cover, a pressure plate, clutch disengaging means, a driven plate, a main annular coned spring having radial corrugations, said cover and pressure plate having lugs in said corrugations, and a plurality of releasing springs attached to said coned spring, cover and pressure plate and operable in response to said clutch disengaging means to release said pressure plate from its clutch engaging position said springs being weighted to progressively supplement the pressure of said main spring upon said pressure plate in response to centrifugal force.

4. In a clutch, a flywheel, a driven plate, a pressure plate, a cover, an annular coned spring engaging said pressure plate and reacting on said cover at unequally great radial distances, auxiliary springs operable in response to clutch release to withdraw said pressure plate and also operable in response to centrifugal force to supplement the pressure of the coned spring on the pressure plate, said auxiliary springs having weight producing coils, an arm engaging said cover and pressure plate at unequal radial distances and an arm engaging said coned spring on that side of the region of engagement with the cover remote from the engagement with the pressure plate.

JOHN O. ALMEN.